US008023126B2

(12) United States Patent
Semma et al.

(10) Patent No.: US 8,023,126 B2

(45) Date of Patent: Sep. 20, 2011

(54) IMAGE FORMING APPARATUS WITH A CHARGEABLE CAPACITOR

(75) Inventors: Toshitaka Semma, Kanagawa (JP); Yoshihisa Kimura, Kanagawa (JP); Tetsuya Yano, Kanagawa (JP); Kazuo Ogawa, Kanagawa (JP); Kazuhito Kishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1255 days.

(21) Appl. No.: 11/705,666

(22) Filed: Feb. 13, 2007

(65) Prior Publication Data

US 2007/0201049 A1 Aug. 30, 2007

(30) Foreign Application Priority Data

Feb. 24, 2006 (JP) ................................ 2006-048656

(51) Int. Cl.
*G06K 15/00* (2006.01)

(52) U.S. Cl. .............. 358/1.14; 358/1.1; 347/5; 399/33; 399/75; 399/88; 399/89; 324/500; 324/512; 324/519; 324/713; 713/300

(58) Field of Classification Search ................. 358/1.14, 358/1.1; 347/5; 399/33, 75, 88–89; 324/500, 324/512, 519, 713; 713/300
See application file for complete search history.

(56) References Cited

U.S. PATENT DOCUMENTS

| | | | | |
|---|---|---|---|---|
| 6,393,233 | B1 * | 5/2002 | Soulier | 399/88 |
| 7,360,100 | B2 * | 4/2008 | Allred et al. | 713/300 |
| 2002/0001010 | A1 * | 1/2002 | Abe | 347/19 |
| 2003/0081253 | A1 * | 5/2003 | Sekiguchi et al. | 358/1.16 |
| 2005/0191078 | A1 * | 9/2005 | Kishi et al. | 399/88 |

FOREIGN PATENT DOCUMENTS

| | | | |
|---|---|---|---|
| JP | 05338320 | A * | 12/1993 |
| JP | 2001188447 | A * | 7/2001 |
| JP | 2005-221774 | | 8/2005 |

* cited by examiner

*Primary Examiner* — Chan S Park
*Assistant Examiner* — Kenneth Kwan
(74) *Attorney, Agent, or Firm* — Cooper & Dunham LLP

(57) ABSTRACT

An image forming apparatus includes a main power unit that outputs a first DC power and an auxiliary power unit that outputs a second DC power to the components of the image forming apparatus. The auxiliary power unit includes a rechargeable capacitor. A measuring unit measures performance of the capacitor and a determining unit determines performance insufficiency of the capacitor based on the measured performance and the system configuration of the image forming apparatus. The performance is, for example, changes in a capacitance of the capacitor with time. When the determining unit determines performance insufficiency of the capacitor, a control unit adjusts, for example, a use range of the capacitor.

14 Claims, 18 Drawing Sheets

| NAME OF PERIPHERAL APPARATUS | POWER CONSUMPTION |
| --- | --- |
| ADF | 30W |
| BANK 1 | 60W |
| BANK 2 | 80W |
| LCT | 80W |
| FINISHER 1 | 100W |
| FINISHER 2 | 120W |
| FINISHER OPTION 1 | 20W |
| FINISHER OPTION 2 | 40W |

FIG. 10

| NAME OF PERIPHERAL APPARATUS | | FINISHER-NO | | FINISHER-YES | |
|---|---|---|---|---|---|
| | | BANK-NO | BANK-YES | BANK-NO | BANK-YES |
| ADF-NO | LCT-NO | SYSTEM 0 (NO PERIPHERAL APPARATUS) | SYSTEM m1 | SYSTEM m2 | SYSTEM m3 |
| | LCT-YES | SYSTEM m4 | SYSTEM m5 | SYSTEM m6 | SYSTEM m7 |
| ADF-YES | LCT-NO | SYSTEM m8 | SYSTEM m9 | SYSTEM m10 | SYSTEM m11 |
| | LCT-YES | SYSTEM m12 | SYSTEM m13 | SYSTEM m14 | SYSTEM m15 (FULL SYSTEM) |

YES: CONNECTED TO DIGITAL COPYING MACHINE
NO: NOT CONNECTED TO DIGITAL COPYING MACHINE

IMAGE FORMING APPARATUS WITH A CHARGEABLE CAPACITOR

CROSS-REFERENCE TO RELATED APPLICATIONS

The present document incorporates by reference the entire contents of Japanese priority document, 2006-048656 filed in Japan on Feb. 24, 2006.

BACKGROUND

1. Technical Field

This disclosure generally relates to a technology for controlling power supply of an image forming apparatus and specifically relates to a technology for controlling power supply of a power source of the image forming apparatus when a peripheral apparatus is newly connected to the image forming apparatus.

2. Description of the Related Art

Generally, in an image forming apparatus of an electrophotographic type, a short startup time is required for making a printing ready immediately after power is turned on or when an energy saving mode is returned to an operation mode. The image forming apparatus is, for example, a copying machine and a printer. The image forming apparatus includes an image forming unit that includes a photosensitive member, a charging unit, an exposing unit, a developing unit, a transfer unit, and the like that are arranged in the vicinity of the photosensitive member, and a fixing device for fixing a toner image transferred onto a transfer paper by the transfer unit. The fixing device is provided with a fixing roller installed with a heater. A heater control device that controls energization to the heater is further provided to maintain the temperature of the fixing roller constant. Commonly, a factor that affects a startup time most is time for warming up at startup of the fixing device. Accordingly, if the time for warming up the fixing device can be shortened, the startup time before printing becomes ready can also be shortened.

Furthermore, in recent years, ordinary image forming apparatuses can be connected to outside apparatuses via a network, and an image forming apparatus is often used with power on all the time. Therefore, it is important to make the time taken for returning from an energy saving mode shorter.

Shortening of startup time has been conventionally performed by providing an auxiliary power device that supplies rechargeable DC power. When quick startup is needed, power is supplied to loads inside the apparatus from both the main power source and the auxiliary power source without drawing excess load from a commercial alternating-current (AC) power supply line serving as a primary power source. Quick startup of the fixing device can be performed by supplying sufficient power to the fixing device with the use of the auxiliary power device that uses a capacitor such as an electrical double-layer capacitor and supplies rechargeable DC power.

Even though a capacitor such as an electrical double-layer capacitor is used, deterioration in performance sometimes occurs. For example, when the capacitance of the capacitor decreases owing to performance deterioration, there are problems that electric energy to be supplied becomes insufficient and the proper function of the capacitor cannot be sufficiently realized. Accordingly, the image forming apparatus generally includes a unit that monitors common deterioration in performance of the capacitor, and when performance deterioration is detected, the capacitor is immediately regarded as abnormal, and countermeasures that recommend a user to exchange the capacitor are taken by giving a warning with a service call and the like.

However, when the determination of deterioration in performance of the capacitor is not proper, a warning is given even though the capacitor is still usable. Hence, a technology for determining when a warning is given is disclosed in Japanese Patent Application Laid-Open Publication No. 2005-221774. In the technology, an image forming apparatus includes a unit that detects performance deterioration of the capacitor as well as a unit that detects productivity reduction of image formation and controls timing for giving a warning using logical multiplication (AND). Namely, when the logical multiplication between detection of performance deterioration of the capacitor and detection of productivity reduction is established, it is determined that a warning needs to be given.

However, there are various system structures (combinations of functional units) for an image forming apparatus. Even though the same printer engine (printing mechanism to form images on paper) is used, the system scale and the power consumption vary depending on whether other units such as a document image reading unit (scanner), an automatic document feeder (ADF), an additional paper feeder (paper bank), a large capacitance tray (LCT), or a finisher are provided. When deterioration in performance of the capacitor becomes worse to some extent, startup is often delayed due to insufficiency of auxiliary power in an image forming apparatus in a large system and it causes deterioration in the usability of a user. On the other hand, a delay in startup caused by insufficiency of auxiliary power hardly occurs in an image forming apparatus in a small system, which does not impair the usability of a user. Even though performance deterioration of a capacitor becomes worse to a significant degree, the usability of a user is not impaired badly in an image forming apparatus in a small system, and it is possible to continuously use the auxiliary power device in the small system.

BRIEF SUMMARY

According to an aspect of this disclosure an image forming apparatus includes a first power-supply unit that outputs a first DC power; a second power-supply unit that outputs a second DC power, the second power-supply unit including a chargeable capacitor; a measuring unit that measures a performance of the capacitor; and a determining unit that determines performance insufficiency of the capacitor based on the performance measured by the measuring unit and a system configuration of the image forming apparatus.

The aforementioned and other aspects, features, advantages and technical and industrial significance will be better understood by reading the following detailed description of presently preferred embodiments, when considered in connection with the accompanying drawings.

BRIEF DESCRIPTION OF THE DRAWINGS

FIG. 10 is an example of contents of system-structure classification table used for an operation shown in FIG. 9;

DETAILED DESCRIPTION OF THE PREFERRED EMBODIMENTS

Exemplary embodiments of the present invention are explained below in detail with reference to accompanying drawings. The present invention is not limited to the following embodiments.

Figure 1:
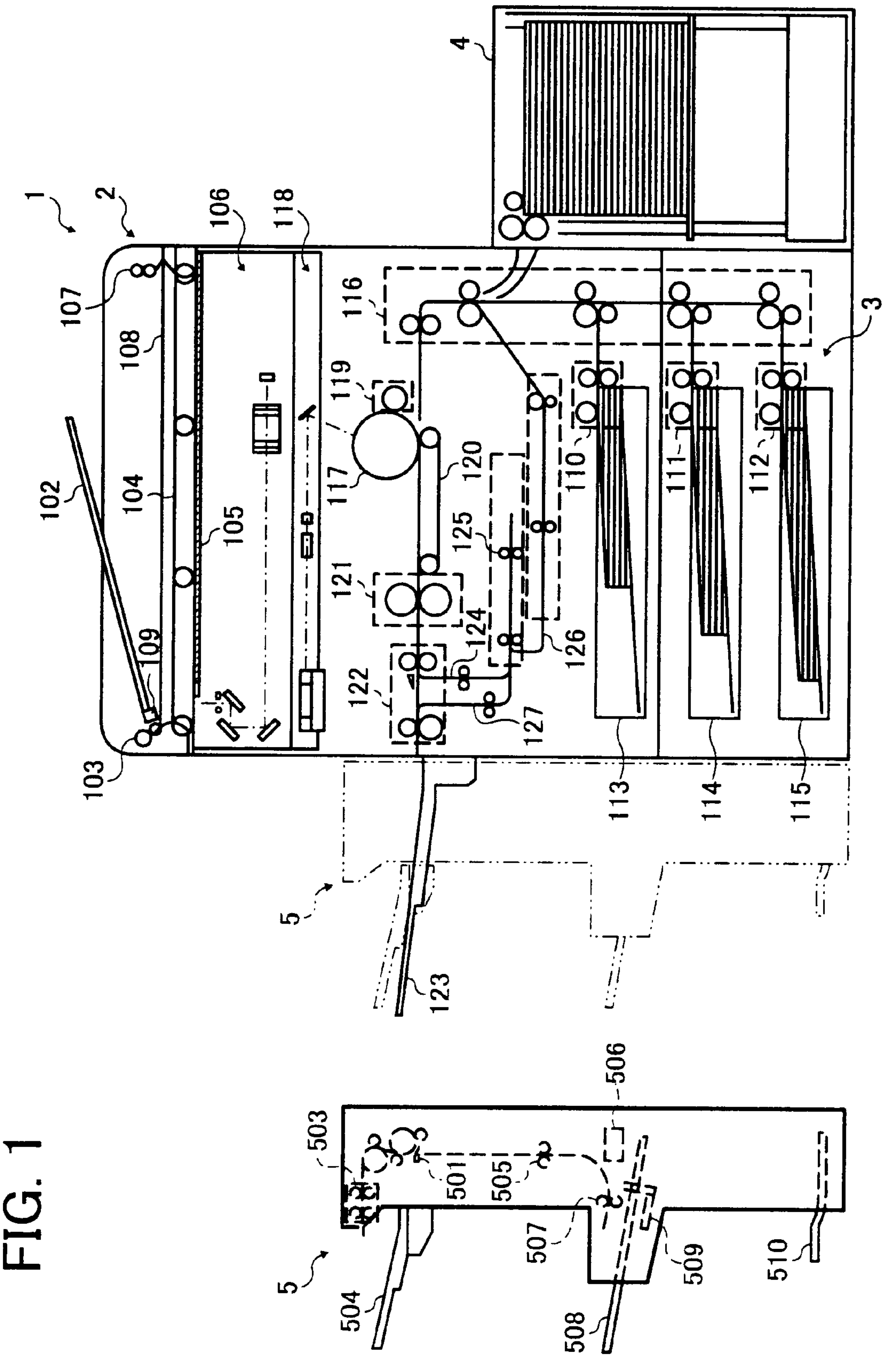
FIG. 1 is a side view of a digital copying machine according to a first embodiment of the present invention.

FIG. 1 is a longitudinal side view of a digital copying machine 1 according to a first embodiment of the present invention. The digital copying machine 1 is so called digital multifunction product. That is, the digital copying machine 1 has a copy function and at least one other function. The other function can be a print function or a facsimile function. Selection of the functions of copy, print, and facsimile is possible by operating application switching keys (not shown) of an operating unit 220 shown in FIG. 3. In this manner, the digital copying machine 1 is in a copy mode when the copy function is selected, in a print mode when the print function is selected, and in a facsimile mode when the facsimile function is selected.

Next, the schematic structure of the digital copying machine 1 and an operation in the copy mode are explained below. In FIG. 1, in an automatic document feeder (ADF) 2, a document placed on a document stand 102 with an image face up is delivered to a predetermined position on a contact glass 105 by a paper feed roller 103 and a conveyor belt 104 when a start key on the operating unit 220 is pressed. The ADF 2 has a counting function that counts up the number of documents every time when delivery of a document is completed. After image information is read by an image reader 106, the document on the contact glass 105 is delivered onto a paper delivery table 108 by the conveyor belt 104 and delivery rollers 107.

When subsequent documents present on the document stand 102 are detected by a document set detector 109, a document placed at the bottom of the documents on the document stand 102 is similarly delivered to the predetermined position on the contact glass 105 by the paper feed roller 103 and the conveyor belt 104. After the image information is read by the image reader 106, the document on the contact glass 105 is delivered onto the paper delivery table 108 by the conveyor belt 104 and the delivery rollers 107. The paper feed roller 103, the conveyor belt 104, and the delivery rollers 107 are driven by a delivery motor (not shown).

A first paper feeder 110 in the digital copying machine 1 and a second paper feeder 111 and a third paper feeder 112 that are in an additional paper feeder (hereinafter, "bank") 3 of the digital copying machine 1 feed transfer paper loaded therein when each paper feeder is selected. The transfer paper is delivered to the position where the transfer paper comes into contact with a photosensitive member 117 by a vertical delivery unit 116. The photosensitive member 117 employs, for example, a photosensitive drum and is rotatably driven by a main motor (not shown).

After predetermined image processing is performed by an image processor (not shown), the image data read from the document by the image reader 106 is converted into optical information by a writing unit 118. The optical information from the writing unit 118 is exposed on the charger surface uniformly charged by a charger (not shown) of the photosensitive member 117, and an electrostatic latent image is formed on the photosensitive member 117. The electrostatic latent image is developed by a developing device 119 and is formed into a toner image. A printer engine that performs image formation in an electrophotographic method on a transfer medium such as a paper, that is, a transfer paper is constructed from the writing unit 118, the photosensitive member 117, the developing device 119, other well-known devices (not shown) disposed around the photosensitive member 117, and the like.

A conveyor belt 120 serves as a paper feeding unit as well as a transfer unit, is applied with transfer bias from the power source, and transfers the toner image on the photosensitive member 117 to the transfer paper while delivering the transfer paper from the vertical delivery unit 116 at the same speed as the photosensitive member 117. The toner image is fixed on the transfer paper by a fixing device 121, and the transfer paper is delivered to a paper delivery tray 123 by a paper delivery unit 122. The remaining toner on the photosensitive member 117 is cleaned by a cleaning device (not shown) after the toner image is transferred.

The above operation is for copying an image on one side of a paper in an ordinary mode. When images are copied on two sides of a transfer paper in a duplex mode, a sheet of the transfer paper fed from any one of paper feed trays 113 to 115 and on which surface an image is formed as described above is delivered not to the side of the paper delivery tray 123 but to the side of a two-sided insertion feed path 124 by the paper delivery unit 122, switched back by a reversing unit 125 to reverse the front and the back, and delivered to a duplex delivery unit 126.

The transfer paper delivered to the duplex delivery unit 126 is delivered to the vertical delivery unit 116 by the duplex delivery unit 126, delivered to the position where the transfer paper comes into contact with the photosensitive member 117 by the vertical delivery unit 116, and a toner image formed on the photosensitive member 117 as described above is transferred on the back surface of the transfer paper and is fixed by the fixing device 121, thereby making a two-sided copy. The two-sided copy is delivered to the paper delivery tray 123 by the paper delivery unit 122.

When transfer paper is delivered upside down, the transfer paper whose front surface and back surface are reversed by being switched back by the reversing unit 125 is delivered to the paper delivery tray 123 by the paper delivery unit 122 via a reversed-paper delivery path 127 without being delivered to the duplex delivery unit 126.

In a print mode, image data from external devices is input to the writing unit 118 in place of the image data from the image processor, and an image is formed on a transfer paper similarly as described above.

Furthermore, in a facsimile mode, an image data from the image reader 106 is transmitted to a receiver by a facsimile transmitting-receiving unit (not shown). Image data transmitted from a sender is received by the facsimile transmitting-receiving unit and input to the writing unit 118 in place of the image data from the image processor, thereby forming an image on a transfer paper similarly as described above.

Although the digital copying machine 1 is provided with a pressure plate (not shown) for pressing a document onto the contact glass 105 in a standard state, the ADF 2 can be set up as a peripheral apparatus. As other peripheral apparatuses, the bank 3, a large capacitance tray (hereinafter, "LCT") 4, a finisher 5 that is a postprocessor to perform sorting, punching, stapling, and the like can also be set up. In FIG. 1, the finisher 5 is illustrated in a state where it is not connected to the digital copying machine 1. When the finisher 5 is connected, the paper delivery tray 123 is first removed from the digital copying machine 1, and then the finisher 5 is attached to the digital copying machine 1. Although not shown in FIG. 1, the digital copying machine 1 is also provided with the operating unit 220 (see FIG. 3) including various keys, a liquid crystal display (LCD), and the like with which settings of a mode for reading documents and copy magnification, a setting of paper feed tiers, settings of postprocessing performed by the finisher 5, display for an operator, and the like are performed.

The finisher 5 shown in FIG. 1, when attached to the digital copying machine 1, can guide a transfer paper delivered by the paper delivery unit 122 in a delivery roller 503 direction and the staple processing unit direction. By switching a switch plate 501 to the upward direction, the transfer paper can be delivered to the side of a paper delivery tray 504 via the delivery rollers 503. Furthermore, by switching the switch plate 501 to the downward direction, the transfer paper can be delivered to a staple table 508 via delivery rollers 505 and 507. The edges of transfer paper loaded on the staple table 508 are evened up by a jogger 509 for paper jogging every time when a sheet of paper is delivered, and when a set of copy is completed, it is stapled by a staler 506. A stack of transfer papers stapled by the stapler 506 are placed on a staple-completion-paper-delivery tray 510 due to their own weight. On the other hand, the ordinary paper delivery tray 504 is a paper delivery tray movable back and forth (in the direction perpendicular to the paper of FIG. 1). The paper delivery tray 504 moves back and forth for every document or a set of copies sorted by an image memory to sort copy papers temporarily delivered.

Figure 2:
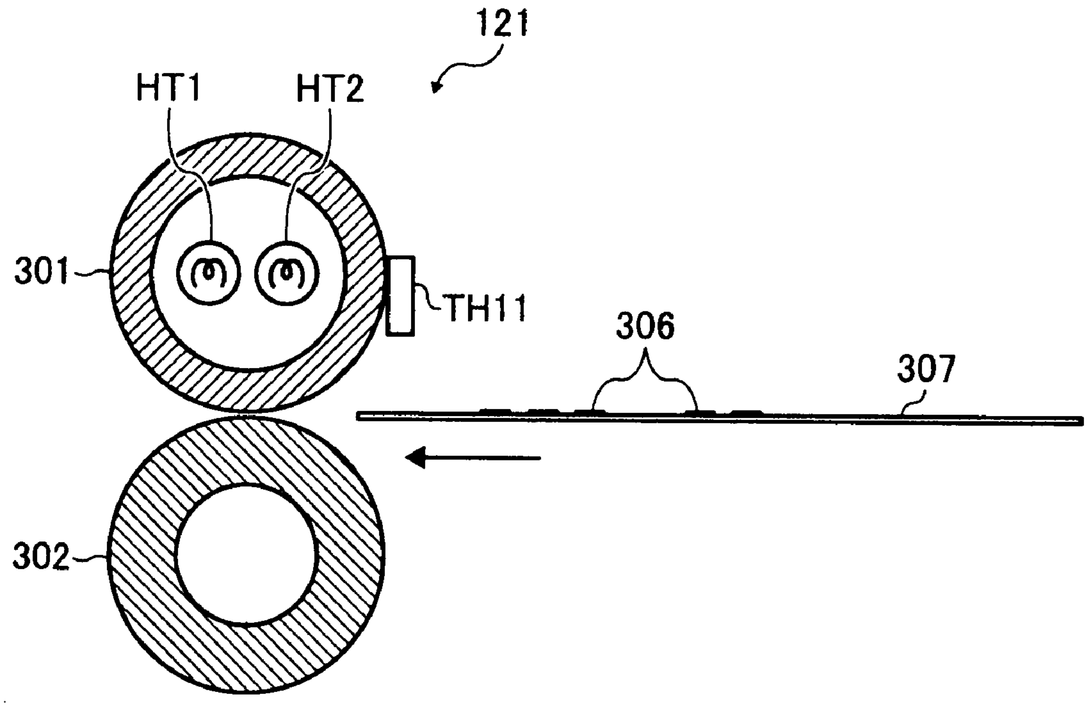
FIG. 2 is an enlarged transverse sectional view of fixing rollers of a fixing device shown in FIG. 1.

With reference to FIG. 2, the structure of the fixing device 121 is explained. As shown in FIG. 2, in the fixing device 121, a pressure roller 302 as a pressure member formed of an elastic material such as silicone rubber is pressed to a fixing roller 301 that is a fixing member, using a constant pressure by a pressure unit (not shown). Fixing members and pressure members are in a roller shape in general; however, for example, either one of them or both can be constructed in an endless belt shape. The fixing device 121 is provided with heaters HT1 and HT2 at appropriate positions. For example, the heaters HT1 and HT2 are disposed inside the fixing roller 301 and heat the fixing roller 301 serving as a fixing member from the inside thereof.

The fixing roller 301 and the pressure roller 302 are rotatably driven by a driving mechanism (not shown). A thermosensor TH11 such as a thermistor is arranged to come in contact with the surface of the fixing roller 301 and detects the surface temperature (fixing temperature) of the fixing roller 301. A toner image 306 that has been transferred on a transfer paper 307 is fixed thereon by heat and pressure by the fixing roller 301 and the pressure roller 302 when the transfer paper 307 passes through a nip portion between the fixing roller 301 and the pressure roller 302.

The fixing heater HT1 serving as a first heating member is a secondary heater (auxiliary heater) to heat the fixing roller 301, which is turned ON at the time of switching ON the main power source of the digital copying machine 1, at the time of startup from an off-mode for energy saving till the digital copying machine 1 becomes ready for copying, and so forth, that is, the fixing heater HT1 is turned ON at the time of warm-up of the fixing device 121 or when the temperature of the fixing roller 301 does not reach a target temperature serving as a standard at the time of image formation.

The fixing heater HT2 serving as a second heating member is a primary heater (main heater) to heat the fixing roller 301, which is turned ON when the temperature of the fixing roller 301 does not reach a target temperature serving as a standard, and heats the fixing roller 301 from the inside of the fixing roller 301.

Figure 3:
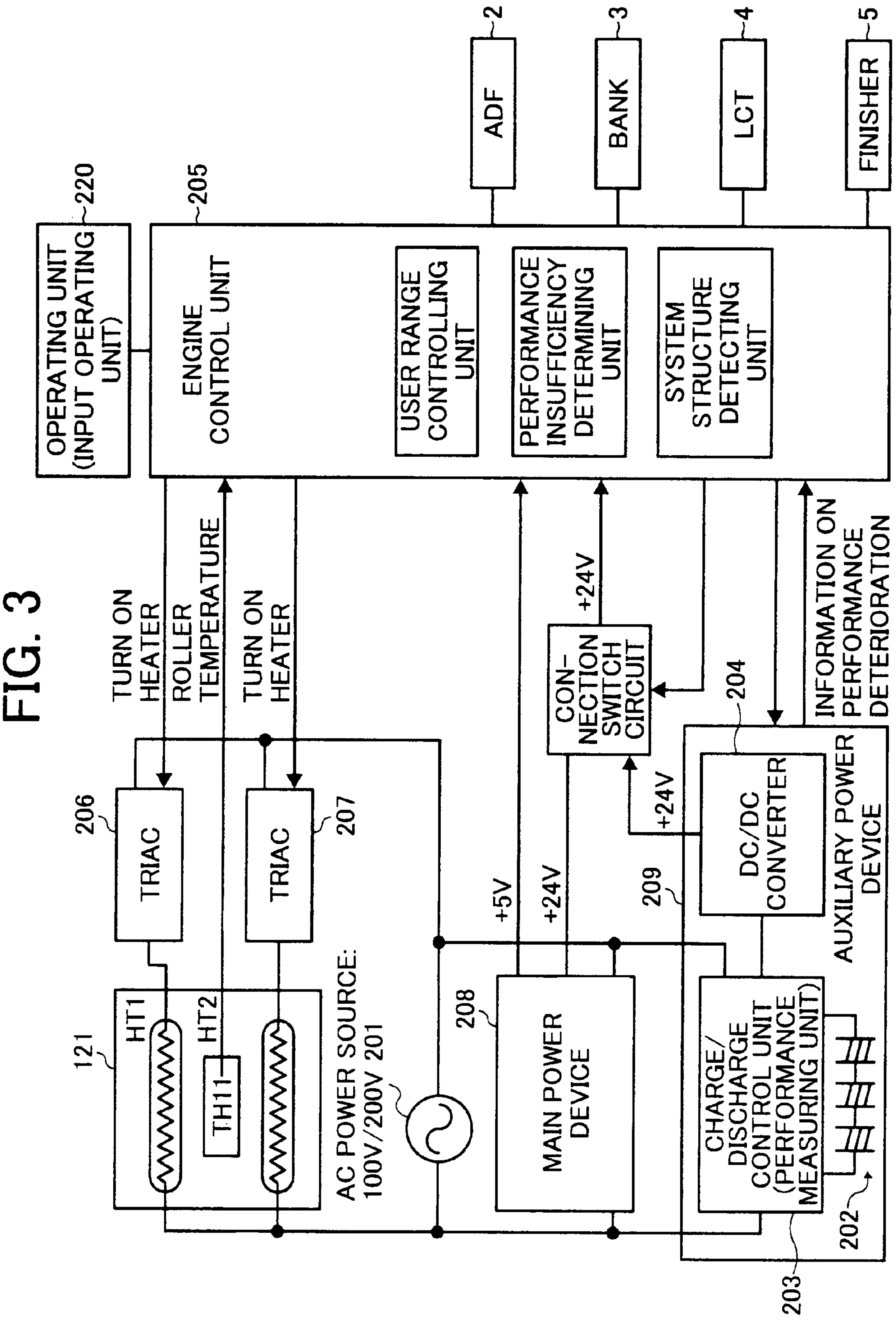
FIG. 3 is a block diagram of a power source of the digital copying machine shown in FIG. 1.

FIG. 3 is a block diagram of a control system of the digital copying machine 1. The control system includes the fixing device 121, a main power device 208, and an auxiliary power device 209. In the control system, the main power device 208 is an ordinary power device and is an alternating-current/direct-current (AC/DC) converter that receives power supply from an AC power source (commercial AC power source) 201 and supplies DC power of control power voltage +5 volts and power voltage +24 volts for power and high voltage. The auxiliary power device 209 is provided with a capacitor 202 that is charged at a voltage converted into DC by receiving power supply from the AC power source (commercial AC power source) 201 and outputs DC current, a charge/discharge control unit 203 that controls charge/discharge of the capacitor 202, and a DC/DC converter 204 that generates constant voltage from the capacitor 202. For the capacitor 202, electrical double-layer capacitor, another capacitor or condenser, a secondary battery, or the like is used. The charge/discharge control unit 203 is provided with a charger (not shown) that receives power supply from the AC power source 201 and charges the capacitor 202, and a switching device (not shown), such as a field-effect transistor (FET), connected to the DC/DC converter 204 that supplies auxiliary power, and supplies and stops DC power from the DC/DC converter 204 by turning the switching device ON/OFF.

Figure 4:
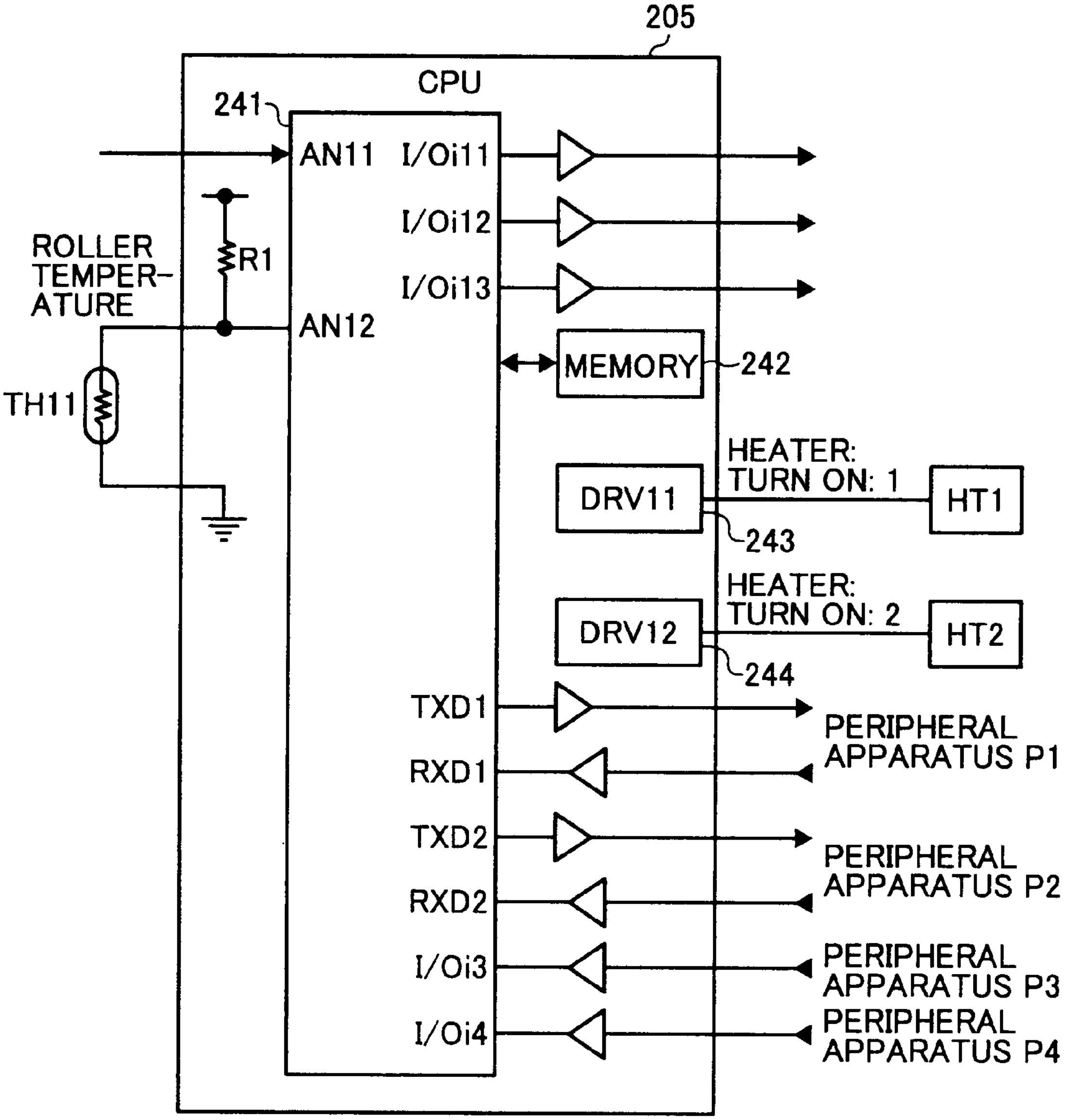
FIG. 4 is a block diagram of an engine control unit shown in FIG. 3.

In FIG. 4, an outline of part of an engine control unit 205 that controls a printer engine is shown. The engine control unit 205 includes a central processing unit (CPU) 241, a memory 242, a heater driver 243 for driving the fixing heaters HT1, a heater driver 244 for driving the fixing heaters HT2, and the like as shown in FIG. 4. The CPU 241 controls an operation of the printer engine and a power source circuit of the digital copying machine 1, is connected to the memory 242 that stores therein programs and data to send a control signal to units attached to the digital copying machine 1, and controls the printer engine, the power source circuit, and the like based on the programs stored in the memory 242.

To the CPU 241, a detection signal (roller temperature signal) divided by the temperature sensor TH11 for detecting the surface temperature of the fixing roller 301 and a resistance value of a resistance R1 and the like are input. The heater drivers 243 and 244 of the engine control unit 205 control applying power to the fixing heaters HT1 and HT2 by controlling switch on and switch off of the switching devices, such as triacs 206 and 207, that are connected between the fixing heaters HT1 and HT2 and the AC power source 201. The engine control unit 205 is connected to the operating unit 220 as well as to the units such as the ADF 2, the bank 3, the LCT 4, and the finisher 5, that is, the peripheral apparatuses.

In addition to such a basic structure, the digital copying machine 1 includes a performance measurement function for measuring the performance of the capacitor 202, a deterioration detection function for detecting performance deterioration of the capacitor 202 based on the performance measured, a system structure detection function for recognizing or detecting a system structure of the digital copying machine 1, a performance-insufficiency determination function for determining performance insufficiency in the capacitor 202 based on the performance of the capacitor 202 and the system structure, and a use-range control function for adjusting a use range or use conditions for the capacitor 202 based on the performance of the capacitor 202 and the system structure.

Figure 5:
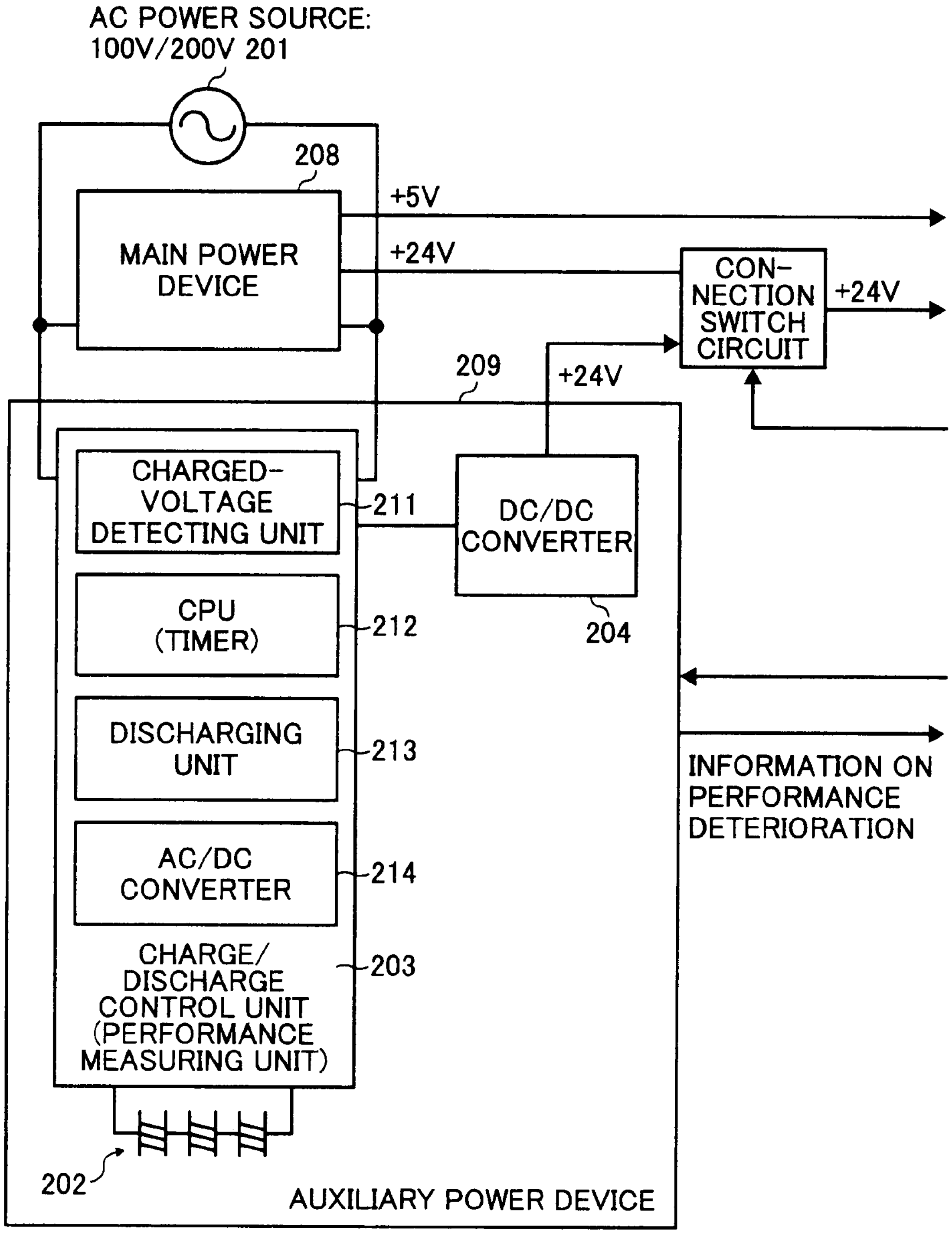
FIG. 5 is a block diagram of an auxiliary power device shown in FIG. 3.

The performance measurement function and the deterioration detection function are performed mainly by the charge/discharge control unit 203. As shown in FIG. 5, the charge/discharge control unit 203 includes a charged-voltage detecting unit 211 that detects voltages of the both edges of the capacitor 202, a CPU 212 with a timer installed therein, a discharging unit 213 that discharges power to the DC/DC converter 204, and an AC/DC converter 214 that converts AC power into direct-current power.

Figure 6:
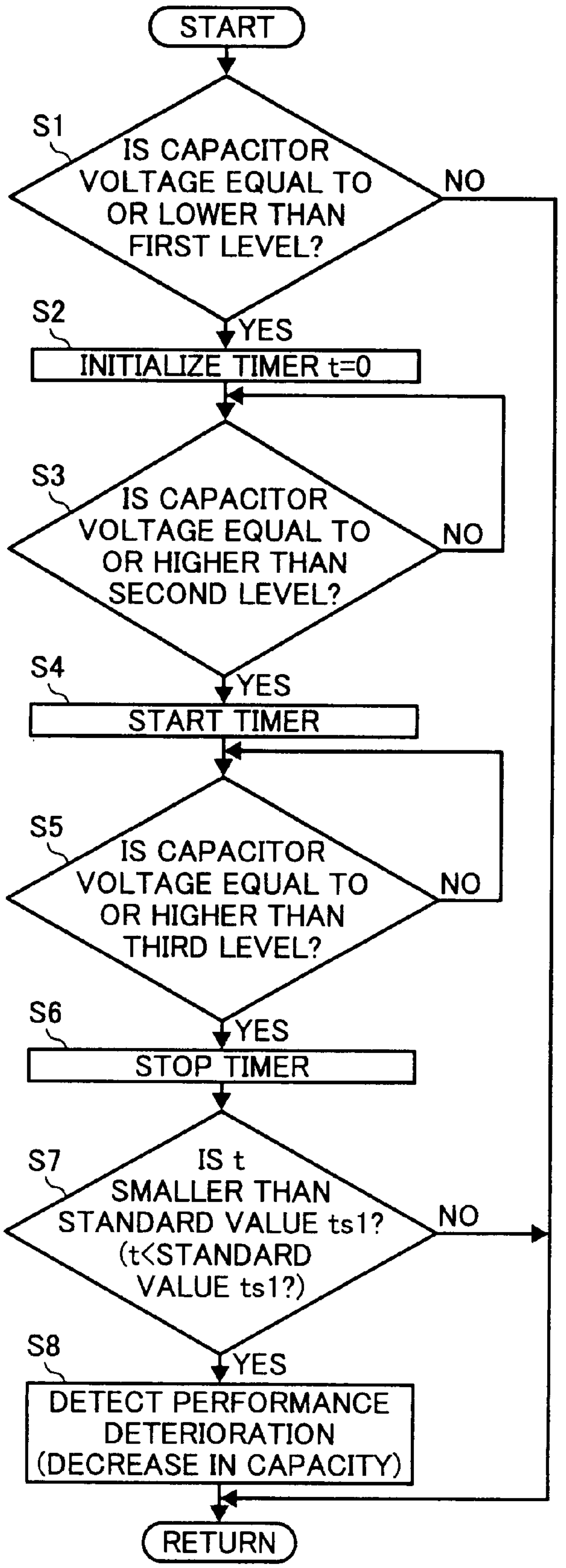
FIG. 6 is a flowchart of an example of a set of a capacitor-performance measurement process and a capacitor-deterioration detection process performed by a charge/discharge control unit shown in FIG. 5.

A deterioration detection process performed by the charge/discharge control unit 203 based on the measurement of the performance of the capacitor 202 is shown in FIG. 6. In FIG. 6, a decrease in capacitance of the capacitor 202 is taken as an index of performance deterioration and exemplifies a case in which a first capacitor voltage level is 20 volts, a second capacitor voltage level is 21 volts, a third capacitor voltage level is 22 volts, and a timer standard value (elapsed-time standard value) ts1 is 11 seconds (corresponding to a decrease to 40% of the capacitor capacitance, the capacitance is 60% of the standard value). The timer standard value ts1 is a standard time required for the capacitor voltage to rise from the second level (21 volts) to the third level (22 volts) when the capacitor 202 is charged with a constant current. When the capacitor 202 is charged with a constant current and when the capacitor capacitance is large, a voltage rising rate of the capacitor voltage is slow, and when the capacitor capacitance is small, the voltage rising rate is fast. Accordingly, when a rising time t from the second level (21 volts) to the third level (22 volts) is measured, the value measured corresponds to the capacitor capacitance. When the measured value t is smaller than the standard value ts1, the capacitor capacitance is less than 60%.

First, a charged voltage of the capacitor 202 is detected by the charged-voltage detecting unit 211, and whether the capacitor voltage detected is equal to or lower than the first level is determined (step S1). When the voltage measured decreases to a level equal to or lower than the first level (Yes at step S1), the timer installed in the CPU 212 is initialized (t=0) (step S2), a charging operation is performed under constant current control, the charged voltage of the capacitor 202 is detected by the charged-voltage detecting unit 211, and it is determined whether the capacitor voltage detected rises to a level equal to or higher than the second level (step S3). When the capacitor voltage reaches the second level, the timer is started (step S4), that is, timekeeping (elapsed-time measurement) is started, a charging operation is further performed under constant current control, the charged voltage of the capacitor 202 is detected by the charged-voltage detecting unit 211, and it is determined whether the capacitor voltage detected rises to a level equal to or higher than the third level (step S5). When the capacitor voltage reaches the third level, the timekeeping by the timer is stopped (step S6), and it is determined whether the time t required for the charging operation, that is, the elapsed-time value is smaller than the timer standard value ts1 that has been preset (step S7). When the elapsed-time value is smaller (Yes at step S7), that is, when the capacitance of the capacitor 202 is less than 60% of the standard value, the charged-voltage detecting unit 211 detects that the capacitor 202 deteriorates in performance owing to a decrease in capacitance (step S8). Such performance (capacitance) measurement and deterioration detection are performed under constant current control of the charging operation for the capacitor 202 in the first embodiment and use the fact that when the capacitance decreases as a mode of deterioration, a charging time becomes shorter than an ordinary charging time (the timer standard value ts1).

There is another mode in which the rising time (charging time) t from the second level (21 volts) to the third level (22 volts) is converted into a capacitance Cp, the capacitance Cp is compared to a threshold 0.4 Cs (Cs is a standard capacitance) corresponding to the standard value ts1, and deterioration is detected when the measured capacitance Cp is smaller than the threshold 0.4 Cs. However, the process to convert the charging time t into a capacitance is omitted in the measurement mode described above.

The performance measurement function and the deterioration detection function are not limited to the above mode and other modes can be acceptable. For example, it is possible to compare a voltage of the capacitor 202 at the time of no load with a voltage at a predetermined time after starting charge and detect performance deterioration based on a change in voltage difference between the both voltages. It is also possible to compare the voltage of the capacitor 202 at the time of no load with a voltage at a predetermined time after supplying power to the DC/DC converter 204 and detect performance deterioration based on a change in voltage difference between the both voltages.

The system structure detection function is performed mainly by the engine control unit 205. As shown in FIG. 4, the CPU 241 in the engine control unit 205 communicates with a peripheral apparatus P1 using serial communication through TXD1 and RXD1 to detect whether the peripheral apparatus P1 is connected to the digital copying machine 1, obtains information about an apparatus type and the like of the peripheral apparatus P1 (one of the ADF 2, the bank 3, the LCT 4, and the finisher 5), and sends control signals when the peripheral apparatus P1 is connected to the digital copying machine 1. Regarding another peripheral apparatus P2, a similar process is performed through TXD2 and RXD2. The CPU 241 recognizes whether other peripheral apparatuses P3 and P4 are connected to the digital copying machine 1 based on input signals received via I/O i3 and I/O i4. The CPU 241 recognizes types of peripheral apparatuses connected to the digital copying machine 1 based on obtained information.

Figures 7, 8:
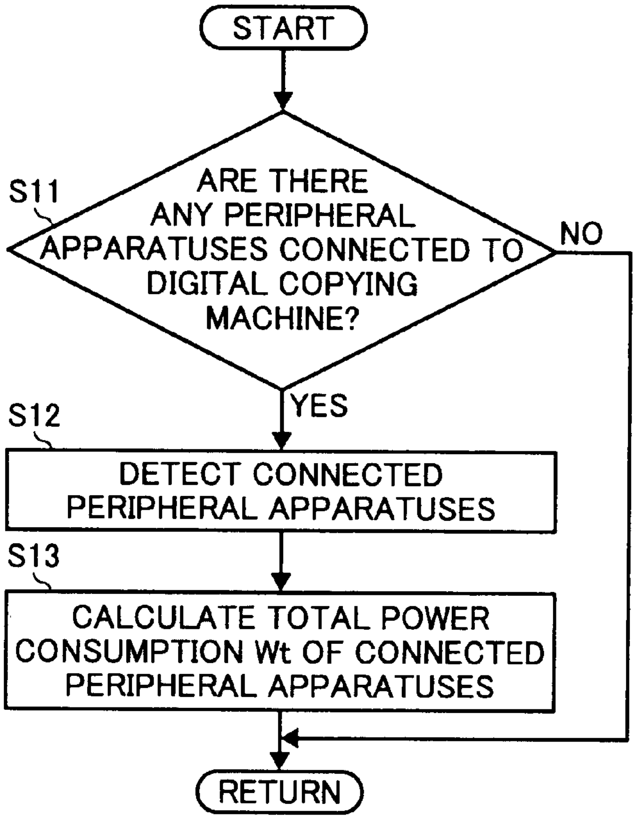
FIG. 7 is a flowchart of an example of a system-structure detection process performed by the engine control unit shown in FIG. 4.
FIG. 8 is an example of contents of a power consumption table of peripheral apparatuses that can be attached to the digital copying machine shown in FIG. 1.

In FIG. 7, a detection operation of recognizing such peripheral apparatuses performed by the engine control unit 205 is shown. In FIG. 7, the engine control unit 205 first detects whether the peripheral apparatuses are connected to the digital copying machine 1 (step S11) and then detects the types of all the connected peripheral apparatuses (step S12). The engine control unit 205 extracts data about power consumption for each of the detected peripheral apparatuses from a peripheral-apparatus-power-consumption table (see FIG. 8) to calculate a total value of the power consumption of the peripheral apparatuses (step S13).

Figure 9:
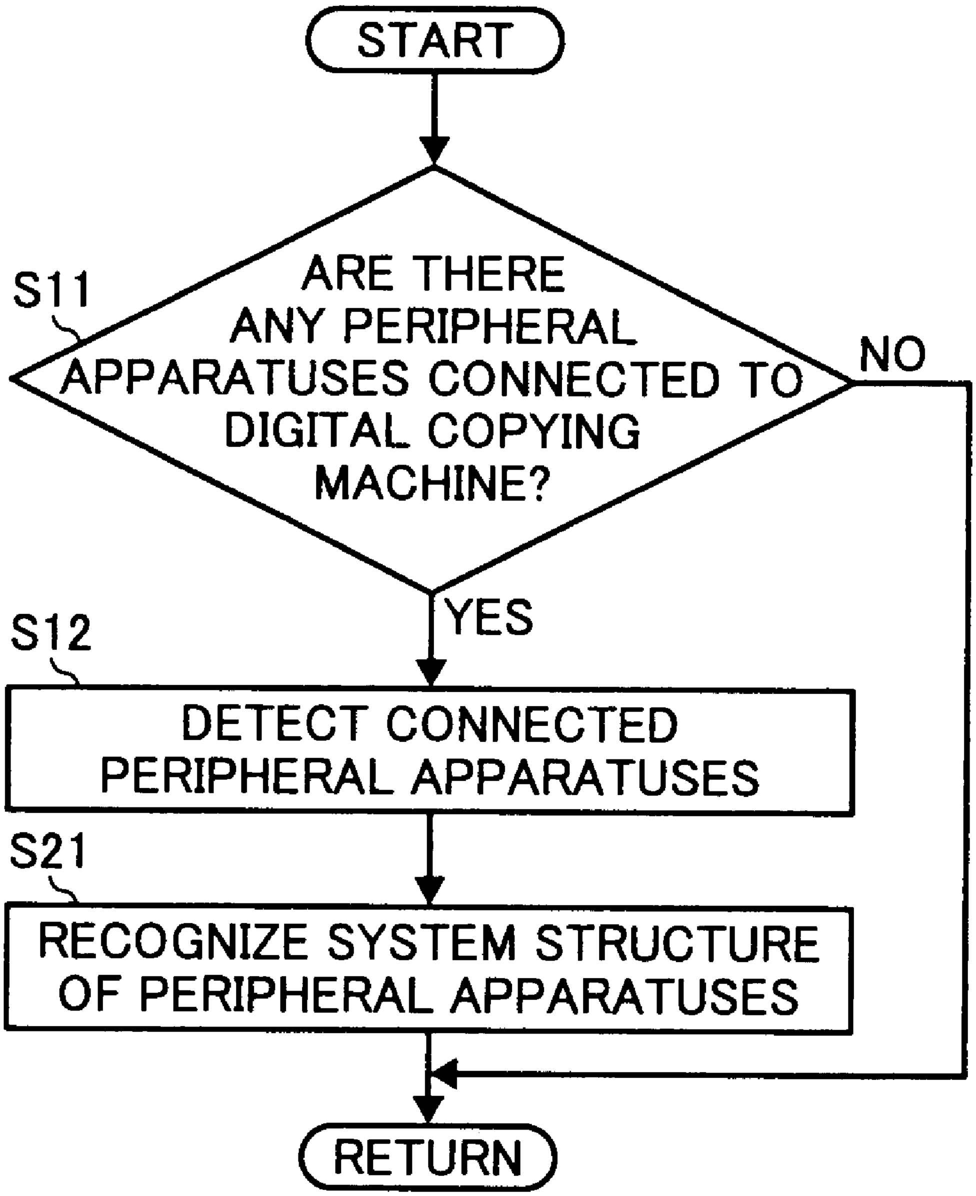
FIG. 9 is a flowchart of another example of the system-structure detection process shown in FIG. 7.

A detection operation of recognizing the peripheral apparatuses in another mode is shown in FIG. 9. In FIG. 9, the engine control unit 205 first detects whether the peripheral apparatuses are connected to the digital copying machine 1 (step S11) and then detects the types of all the connected peripheral apparatuses (step S12). The engine control unit 205 extracts a combination of the detected peripheral apparatuses from a peripheral-apparatus-system structure table (see FIG. 10) to identify the system structure of the peripheral apparatuses (step S21).

Determination of performance insufficiency in the capacitor 202 based on the performance deterioration of the capacitor 202 detected by the charge/discharge control unit 203 and the system structure detected by the engine control unit 205, that is, the performance insufficiency determination function is performed mainly by the engine control unit 205. In other words, the determination on the performance insufficiency is performed by the CPU 241 according to the block diagram in FIG. 4.

Figure 11:
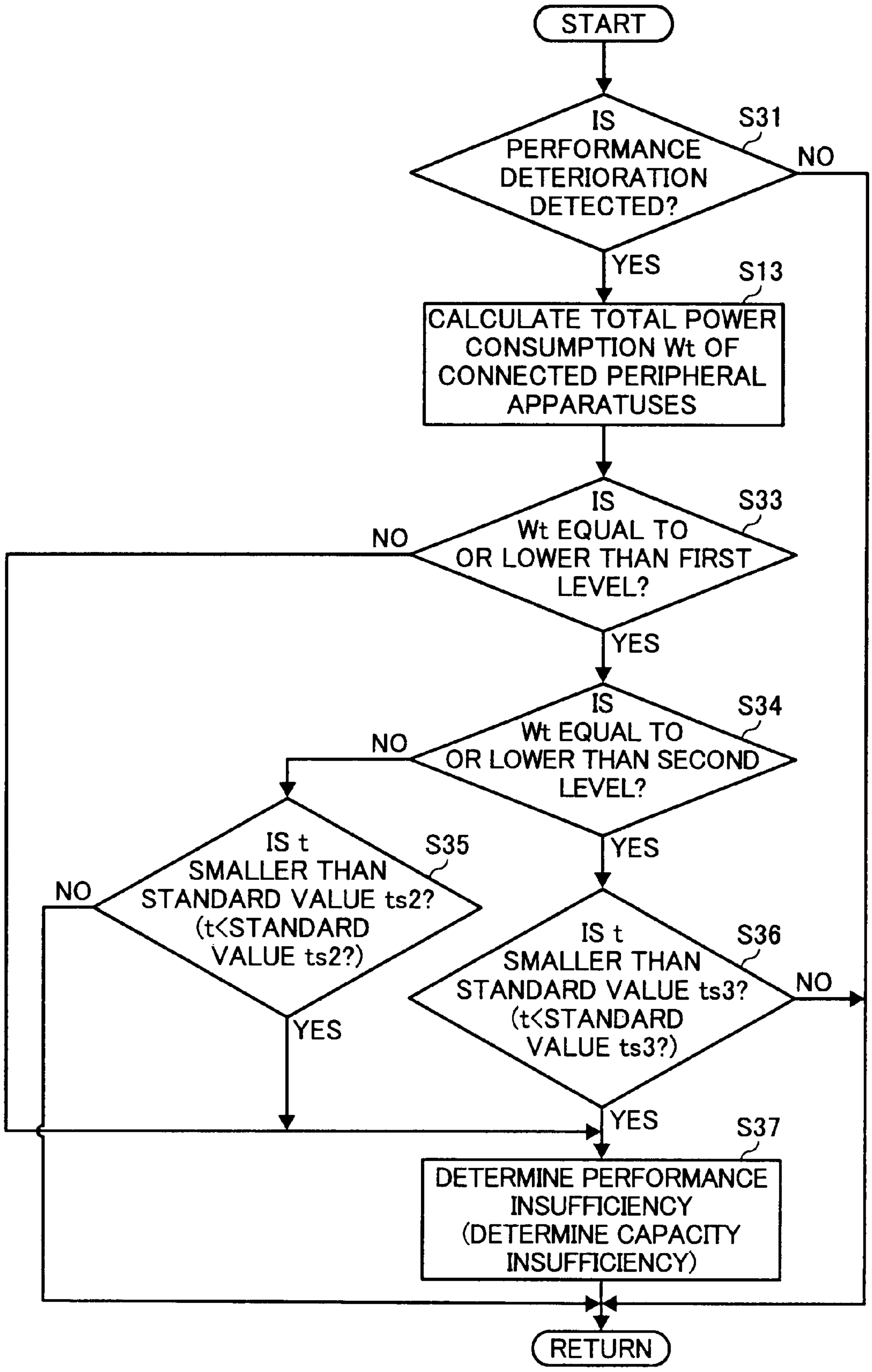
FIG. 11 is a flowchart of an example of a capacitor-performance-insufficiency determination process performed by the engine control unit shown in FIG. 4.

A process of determining performance insufficiency in the capacitor 202 performed by the CPU 241 of the engine control unit 205 is shown in FIG. 11. In FIG. 11, a first level of the total power consumption of the peripheral apparatuses is set to 200 watts, a second level of the total power consumption of the peripheral apparatuses to 100 watts, a timer standard value ts2 to 9 seconds (corresponding to a decrease to 45% of the capacitor capacitance), and a timer standard value ts3 to 7 seconds (corresponding to a decrease to 50% of the capacitor capacitance).

When the charge/discharge control unit 203 detects a decrease in capacitance of the capacitor 202, that is, performance deterioration (Yes at step S31), the CPU 241 calculates the total power consumption of the peripheral apparatuses (step S13) and determines whether the total power consumption calculated is equal to or lower than the first level (step S33). When the total power consumption calculated is not equal to or lower than the first level (No at step S33), the CPU 241 determines that the performance in the capacitor 202 is insufficient owing to a decrease in capacitance of the capacitor 202 in the current system structure (step S37). When the total power consumption is equal to or lower than the first level (Yes at step S33), whether the total power consumption of the peripheral apparatuses is equal to or lower than the second level is further determined (step S34). When the total power consumption is not equal to or lower than the second level (No at step S34), it is determined whether a time t required for a charging operation that has been measured by the charge/discharge control unit 203 is shorter than a timer standard value ts2 that has been preset (step S35). When the time t is shorter (Yes at step S35), the CPU 241 determines that performance of the capacitor 202 is insufficient owing to a decrease in capacitance of the capacitor 202 in the current system structure (step S37). When the total power consumption is equal to or lower than the second level (Yes at step S34), it is determined whether the time t required for a charging operation that has been measured by the charge/discharge control unit 203 is shorter than a timer standard value ts3 that has been preset (step S36). When the time t is shorter (Yes at step S36), the CPU 241 determines that the performance of the capacitor 202 is insufficient owing to a decrease in capacitance of the capacitor 202 in the current system structure (step S37). In this manner, even though the performance of the capacitor 202 deteriorates (Yes at step S31), and even if the capacitance of the capacitor 202 decreases, the digital copying machine 1 in certain system structures can be used because a small DC power supply is sufficient. In this case, the capacitor 202 is not determined as in performance insufficiency.

When the capacitor 202 is determined as in performance insufficiency owing to a decrease in capacitance of the capacitor 202, a warning for requiring a service call is given via a display and the like of the operating unit 220.

Figure 12:
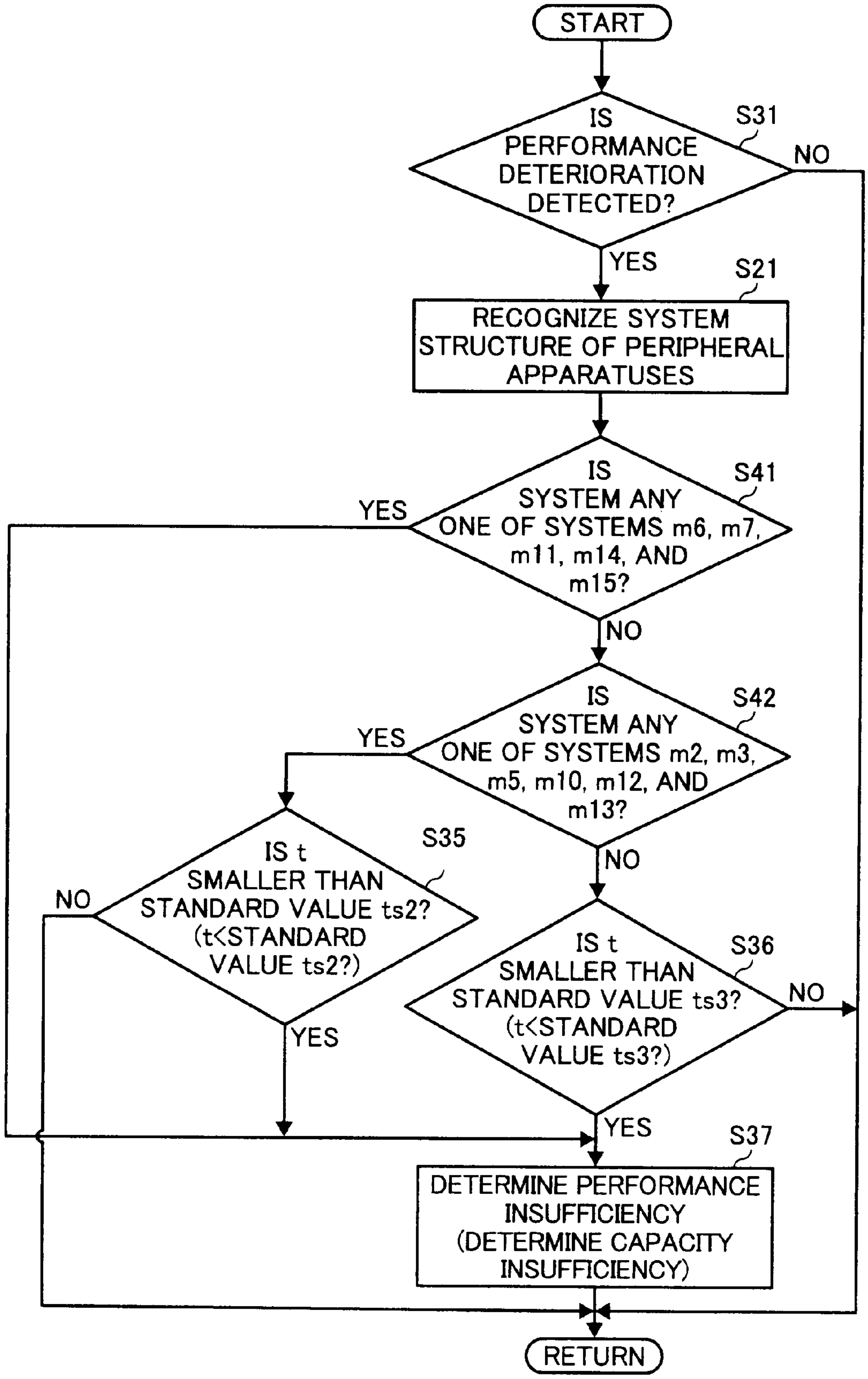
FIG. 12 is a flowchart of another example of the capacitor-performance-insufficiency determination process shown in FIG. 11.

Another example of the process of determining whether the performance of the capacitor 202 is insufficient in another mode is shown in FIG. 12. In FIG. 12, system structures of the peripheral apparatuses are identified as systems m0 to m15 (see FIG. 10) respectively, the timer standard value ts2 is set to 9 seconds (corresponding to a decrease to 45% of the capacitor capacitance) and the timer standard value ts3 to 7 seconds (corresponding to a decrease to 50% of the capacitor capacitance).

When the charge/discharge control unit 203 detects a decrease in capacitance of the capacitor 202, that is, performance deterioration (Yes at step S31), the CPU 241 determines a current system structure of the digital copying machine 1 (step S21). In other words, it is determined whether the current system structure is in any one of systems m6, m7, m11, m14, and m15 shown in FIG. 10 (step S41). When the system structure is in any one of them (Yes at step S41), the CPU 241 determines that the performance of the capacitor 202 is insufficient in the current system structure owing to a decrease in capacitance of the capacitor 202 (step S37). When the current system structure is not in any one of the systems m6, m7, m11, m14, and m15 (No at step S41), whether the current system structure is in any one of systems m2, m3, m5, m10, m12, and 13 shown in FIG. 10 is further determined (step S42). When the current system structure is in any one of them (Yes at step S42), it is determined whether the time t required for a charging operation that has been measured by the charge/discharge control unit 203 is shorter than the timer standard value ts2 that has been preset (step S35). When the time t is shorter (Yes at step S35), the CPU 241 determines that the performance of the capacitor 202 is insufficient owing to a decrease in capacitance of the capacitor 202 in the current system structure (step S37). When the current system structure is not in any one of the systems m2, m3, m5, m10, m12, and m13 (No at step S42), it is determined whether the time t required for a charging operation that has been measured by the charge/discharge control unit 203 is shorter than the timer standard value ts3 that has been preset (step S36). When the time t is shorter (Yes at step S36), the CPU 241 determines that the performance of the capacitor 202 is insufficient owing to a decrease in capacitance of the capacitor 202 in the current system structure (step S37). In this manner, even though the performance of the capacitor 202 deteriorates (Yes at step S31), the digital copying machine 1 can be used even if the capacitance of the capacitor 202 decreases, because a small DC power supply is sufficient depending on certain system structures of the digital copying machine 1. Accordingly, the capacitor 202 is not determined as in performance insufficiency.

When the CPU 241 determines that the performance of the capacitor 202 is insufficient owing to a decrease in capacitance of the capacitor 202, a warning for requiring a service call is given via the display and the like of the operating unit 220.

Figure 13:
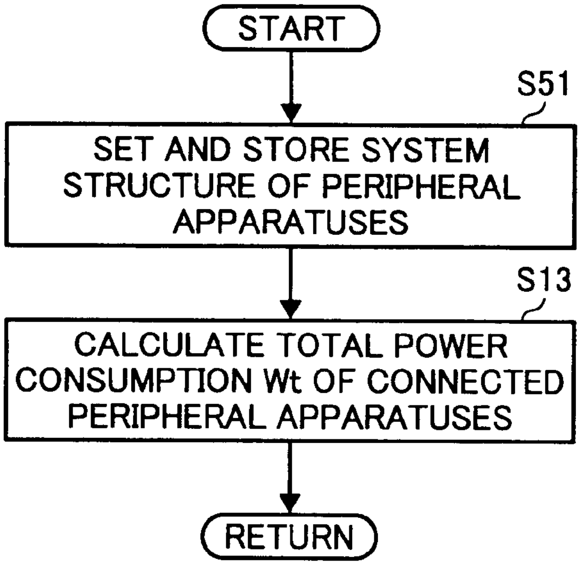
FIG. 13 is a flowchart of still another example of the system-structure detection process shown in FIG. 7.
Figure 14:
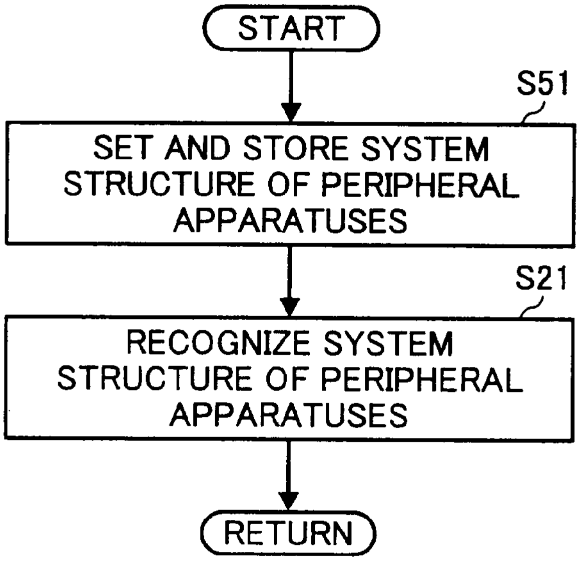
FIG. 14 is a flowchart of still another example of the system-structure detection process shown in FIG. 7.

Regarding the system structure detection, a system structure can be recognized based on settings using the operating unit 220 and the like. FIGS. 13 and 14 are examples of the system-structure detection process using the operating unit 220. In the processes, system structure information of peripheral apparatuses is input, set, and stored in the digital copying machine 1, and the system structures are recognized by referring to the system structure information as necessary.

Figure 15:
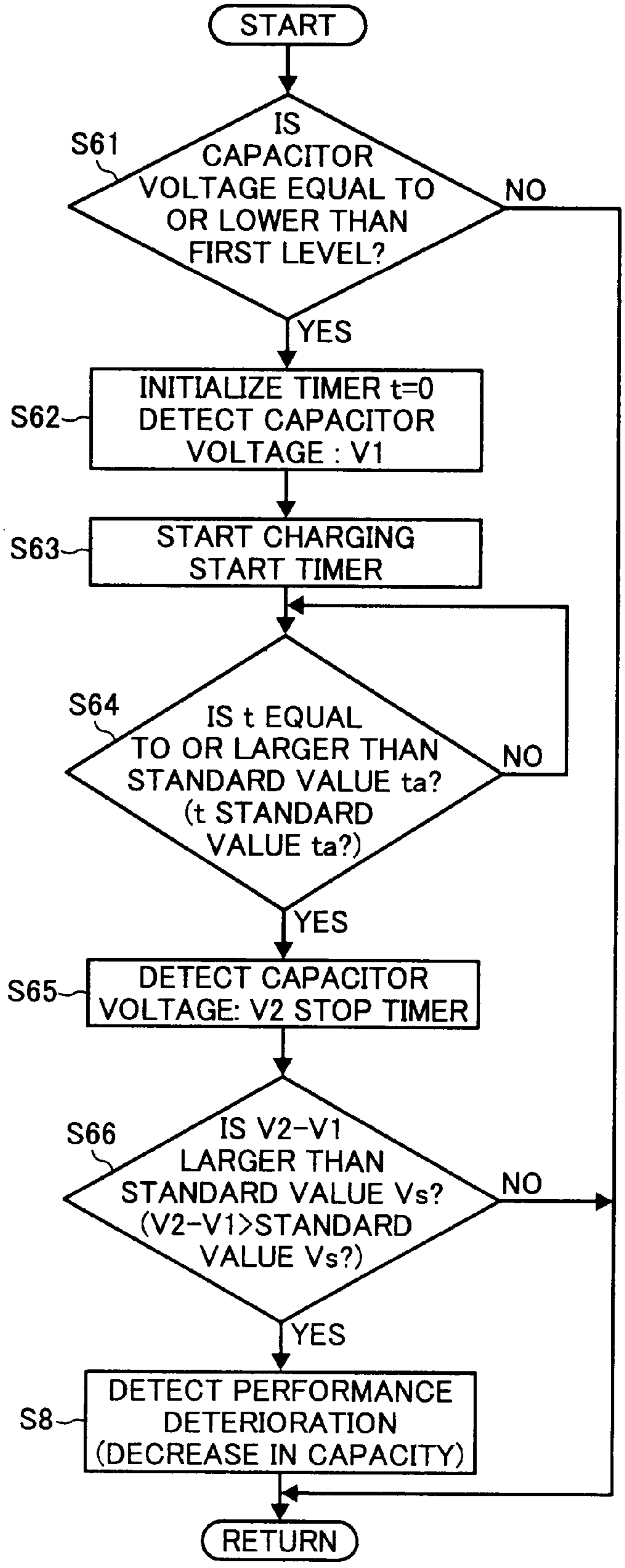
FIG. 15 is a flowchart of another example of the set of the capacitor-performance measurement process and the capacitor-deterioration detection process shown in FIG. 6.

Still another mode for performance measurement and deterioration detection of the capacitor 202 performed by the charge/discharge control unit 203 is shown in FIG. 15. In FIG. 15, the first capacitor voltage level is set to 15 volts, a timer standard value ta to 11 seconds, and a capacitor voltage difference standard value Vs to 2 volts (corresponding to a decrease to 40% of the capacitor capacitance).

First, the charged-voltage detecting unit 211 detects the charged voltage of the capacitor 202 and determines whether the capacitor voltage detected is equal to or lower than the first level (step S61). When the capacitor voltage is equal to or lower than the first level (Yes at S61), the timer installed in the CPU 212 is initialized (t=0), the capacitor voltage detected is stored therein as V1 (step S62), a charging operation is performed under constant current control, and timekeeping is started by the timer (step S63). Thereafter, it is determined whether an elapsed-time value t measured by the timer is equal to or longer than the timer standard value ta that is a predetermined time set in advance (step S64). When the elapsed-time value measured by the timer reaches the timer standard value ta, the charged-voltage detecting unit 211 detects a charged voltage of the capacitor 202, the capacitor voltage detected is stored therein as V2, the timer (timekeeping) is stopped (step S65), and it is determined whether the capacitor-voltage difference V2−V1 raised by the charging operation is larger than the capacitor-voltage-difference standard value Vs set in advance (step S66). When the capacitor-voltage difference is larger (Yes at step S66), the performance deterioration is detected owing to a decrease in capacitance of the capacitor 202 (step S8). In this mode, the detection operation of performance deterioration of the capacitor 202 is performed based on the fact that if the charging operation for the capacitor 202 is performed under constant current control, and when the capacitance of the capacitor 202 decreases as a mode of deterioration, a voltage difference becomes larger than an ordinary voltage rise by charging (the capacitor voltage difference standard value Vs).

Figure 16:
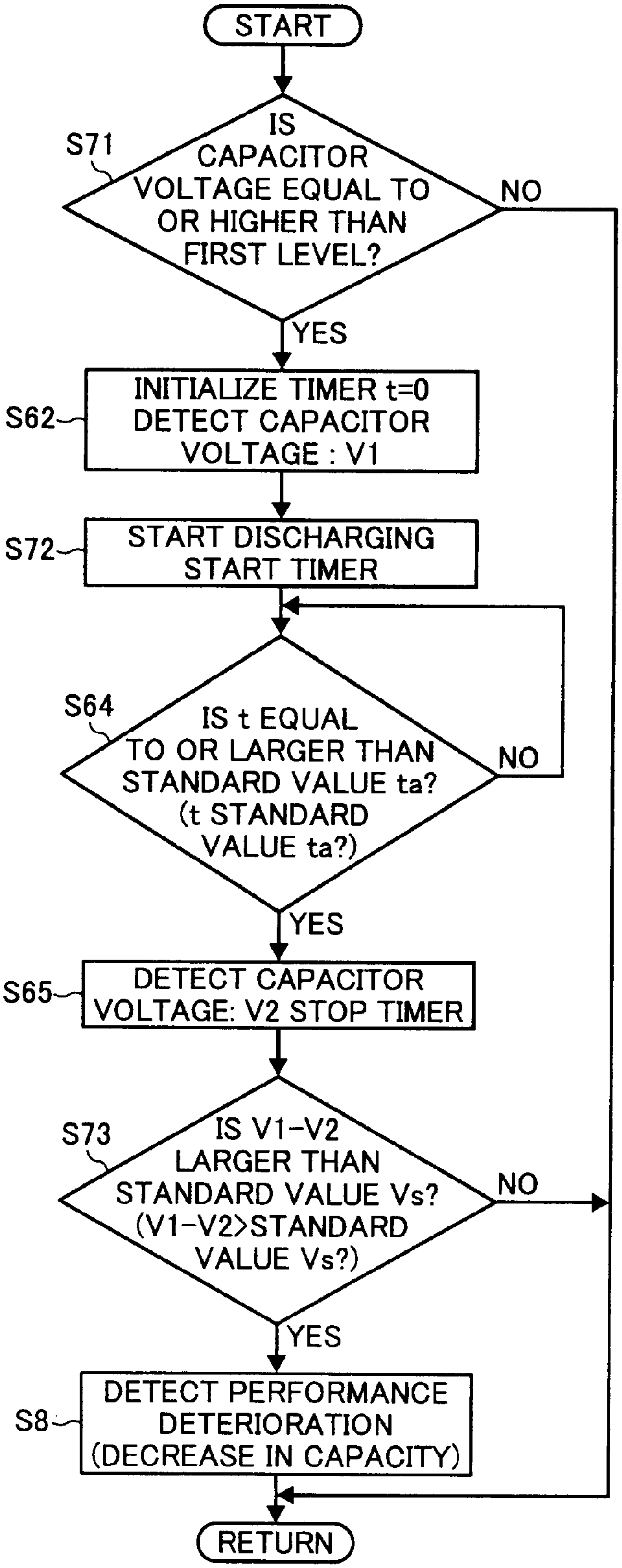
FIG. 16 is a flowchart of still another example of the set of the capacitor-performance measurement process and the capacitor-deterioration detection process shown in FIG. 6.

Still another mode for performance measurement and deterioration detection of the capacitor 202 performed by the charge/discharge control unit 203 is shown in FIG. 16. In FIG. 16, the first capacitor voltage level is set to 22 volts, the timer standard value ta to 10 seconds, and the capacitor voltage difference standard value Vs to 2 volts (corresponding to a decrease to 40% of the capacitor capacitance).

First, the charged-voltage detecting unit 211 detects the charged voltage of the capacitor 202 and determines whether the capacitor voltage detected is equal to or higher than the first level (step S71). When the capacitor voltage is equal to or higher than the first level (Yes at S71), the timer installed in the CPU 212 is initialized (t=0), the capacitor voltage detected is stored therein as V1 (step S62), a discharging operation is performed, and timekeeping is started by the timer (step S72). Thereafter, it is determined whether the elapsed-time value measured by the timer is equal to or longer than the timer standard value ta set in advance (step S64). The charged-voltage detecting unit 211 detects a discharge voltage of the capacitor 202 when the elapsed-time value measured by the timer reaches the timer standard value ta, the capacitor voltage detected is stored therein as V2, the timer (timekeeping) is stopped (step S65), and it is determined whether the capacitor voltage difference V1−V2 due to the decrease by the discharging operation is larger than the capacitor voltage difference standard value Vs that has been preset (step S73). When the capacitor voltage difference is larger (Yes at step S73), performance deterioration is detected owing to a decrease in capacitance of the capacitor 202 (step S8). In this mode, the detection operation of the performance deterioration is performed based on the fact that if the discharging operation for the capacitor 202 is carried out at a constant current, and when the capacitance of the capacitor 202 decreases as a mode of deterioration, the voltage difference becomes larger than an ordinary discharge-voltage-decrease (the capacitor voltage difference standard value Vs).

Use range control in a first mode performed by the engine control unit 205 is explained with reference to FIGS. 17 and 18. According to the use range control function in the first mode, a use voltage range of the capacitor 202 is adjusted based on a system structure of the digital copying machine 1 and performance of the capacitor 202. Specifically, when the charge/discharge control unit 203 detects performance deterioration of the capacitor 202, the engine control unit 205 detects a system structure, calculates a total power consumption of the peripheral apparatuses connected (or recognizes the system of the peripheral apparatuses), and adjusts a setting value of the discharge starting voltage (discharge permitting voltage) that has been set at 20 volts (FIG. 17) to 18 volts (FIG. 18) depending on the state of the peripheral apparatuses.

Figure 17:
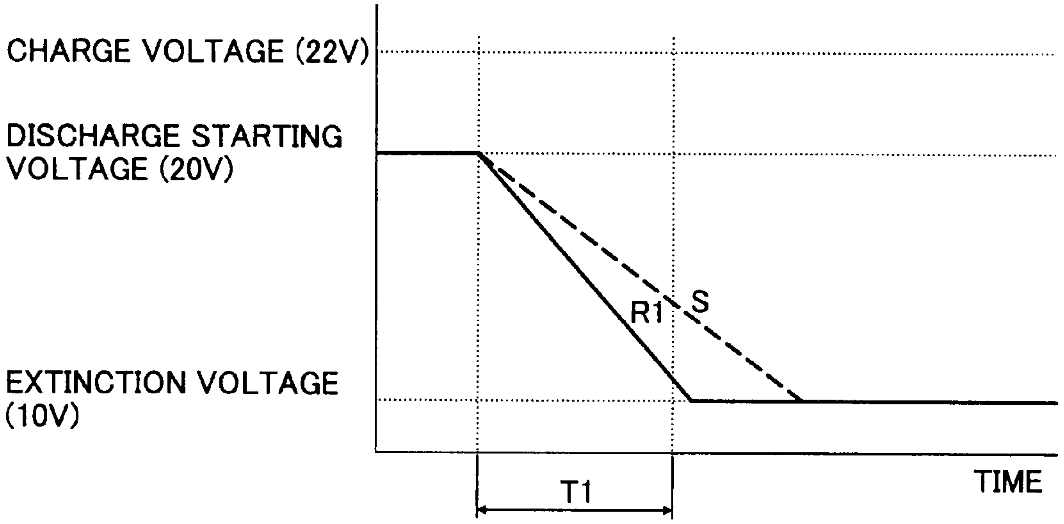
FIG. 17 is a graph of a use voltage range of the capacitor when there is no decrease in capacitor capacitance, a discharge characteristic when there is no decrease in the capacitor capacitance, a discharge characteristic when the capacitor capacitance decreases, and discharge time when a system structure of the digital copying machine is in a full system.

A use voltage range and discharge time of the capacitor 202 when the system structure is in a full system (a maximum scale that can be set) are shown in FIG. 17. In FIG. 17, the horizontal axis represents time, and the vertical axis represents discharge voltage of the capacitor 202. The discharge voltage also corresponds to charge voltage and is detected by the charged-voltage detecting unit 211. Furthermore, in FIG. 17, the broken line S represents a discharge characteristic of the capacitor 202 in an initial state, and the solid line R1 represents a discharge characteristic of the capacitor 202 in a deterioration state.

Figure 18:
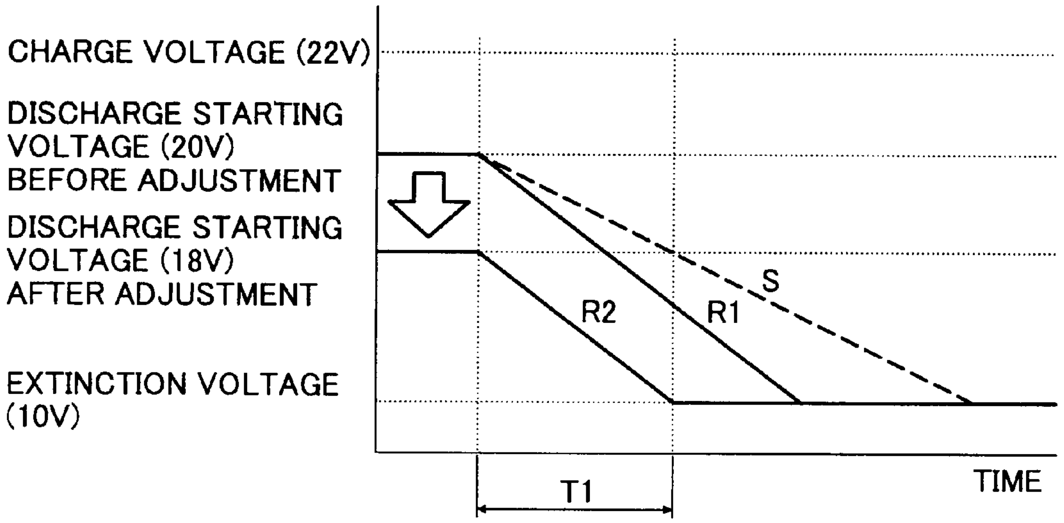
FIG. 18 is a graph of an example of a use voltage range of the capacitor when the system structure is minimum, where the broken line S represents a discharge characteristic of the capacitor in an initial state, the solid line R1 represents a discharge characteristic of the capacitor before adjustment of a discharge starting voltage, and the solid line R2 represents a discharge characteristic of the capacitor in a deterioration state and after the adjustment of the discharge starting voltage.

FIG. 18 is a graph of a use voltage range and discharge time of the capacitor 202 when the system structure is minimum (minimum scale, no connection to peripheral apparatuses). In FIG. 18, the broken line S represents a discharge characteristic of the capacitor 202 in an initial state, the solid line R1 represents a discharge characteristic of the capacitor 202 before adjusting the discharge starting voltage, and the solid line R2 represents a discharge characteristic of the capacitor 202 in a deterioration state and after the adjustment of the discharge starting voltage. In this case, "discharge starting voltage" means a voltage at which discharge becomes possible from the capacitor 202 in a charged state and is a value that is set for control. In other words, when the charged voltage of the capacitor 202 does not reach the discharge starting voltage, a supply of discharge power from the capacitor 202 is not performed. More specifically, when the charged-voltage detecting unit 211 detects that the charged voltage of the capacitor 202 becomes equal to or higher than the discharge starting voltage, the discharge becomes possible.

The charge voltage in FIGS. 17 and 18 means "target charge voltage", that is, a target charge voltage of the capacitor 202 at the time of charging and is a value that is set for control. In other words, when the charged voltage exceeds the discharge starting voltage during charging and when no command of starting discharge is given from the engine control unit 205, charging is carried out until the charged voltage reaches the target charge voltage.

The "extinction voltage" in FIGS. 17 and 18 means a voltage at which discharge from the capacitor 202 in a discharge state is stopped and is a value that is set for control. In other words, when the discharge voltage of the capacitor 202 does not reach the extinction voltage, a supply of discharge power from the capacitor 202 is not stopped. Specifically, when the charged-voltage detecting unit 211 detects that the discharged voltage of the capacitor 202 becomes equal to or lower than the extinction voltage, the discharge is stopped.

As shown by R1 in FIG. 17 and R2 in FIG. 18, a discharge time until voltage reaches the extinction voltage (10 volts) is represented by T1. At this time, the discharge electric energy, that is, electric energy that the auxiliary power device 209 can supply, is sufficient. The discharge starting voltage is adjusted by detecting a system structure in this way, and therefore, the dischargeable voltage range can be widened and the usability for users can be improved.

Use range control in a second mode is explained with reference to FIG. 19. According to the use range control function in the second mode, a use voltage range of the capacitor 202 is adjusted based on a system structure of the digital copying machine 1 and performance of the capacitor 202. Specifically, when the charge/discharge control unit 203 detects performance deterioration of the capacitor 202, the engine control unit 205 detects the system structure, calculates a total power consumption of the peripheral apparatuses connected (or recognizes the system of the peripheral apparatuses), and adjusts a setting value of the extinction voltage that has been set at 10 volts to 12 volts depending on the state of the peripheral apparatuses.

Figure 19:
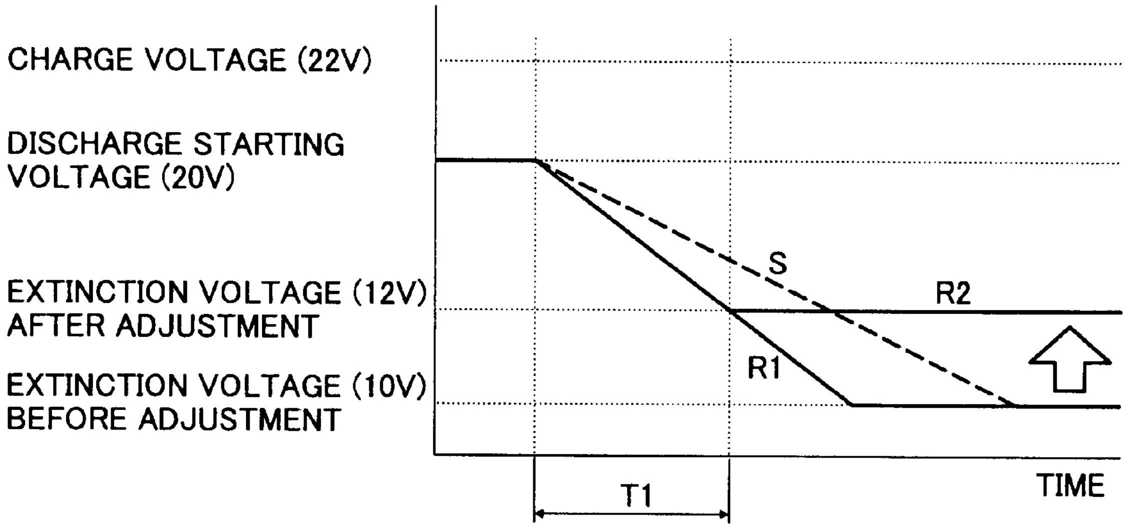
FIG. 19 is a graph of another example of a use voltage range of the capacitor when the system structure is minimum, where the broken line S represents the discharge characteristic of the capacitor in an initial state, the solid line R1 represents a discharge characteristic of the capacitor before adjustment of an extinction voltage, and the solid line R2 represents a discharge characteristic of the capacitor in a deterioration state and after the adjustment of the extinction voltage.

FIG. 19 is a graph of a use voltage range and discharge time of the capacitor 202 when the system structure is minimum (minimum scale, no connection to peripheral apparatuses). In FIG. 19, the broken line S represents the discharge characteristic of the capacitor 202 in an initial state, the solid line R1 represents a discharge characteristic of the capacitor 202 before adjustment of the extinction voltage, and the solid line R2 represents a discharge characteristic of the capacitor 202 in a deterioration state and after the adjustment of the extinction voltage. As shown by R1 in FIG. 17 and R2 in FIG. 19, a discharge time until the voltage reaches the extinction voltage (10 volts or 12 volts) is represented by T1. The discharge electric energy at this time is sufficient as power supply energy. The extinction voltage is adjusted by detecting system structure in this way, and therefore, the usability for users is improved.

Use range control in a third mode is explained with reference to FIG. 20. According to the use range control function in the third mode, a use voltage range of the capacitor 202 is adjusted based on a system structure of the digital copying machine 1 and performance of the capacitor 202, similarly to the first and the second modes. Specifically, when the charge/discharge control unit 203 detects performance deterioration of the capacitor 202, the engine control unit 205 detects the system structure, calculates a total power consumption of the peripheral apparatuses connected (or recognizes the system of the peripheral apparatuses), and adjusts a setting value of the charge voltage that has been set at 22 volts to 20 volts depending on the state of the peripheral apparatuses. The charge voltage means the "target charge voltage" as described above, that is, a target charge voltage of the capacitor 202 at the time of charging, and is a value that is set for control. In other words, when the charged voltage exceeds the discharge starting voltage during charging and when no command of starting discharge is given from the engine control unit 205, charging is continuously performed until the charged voltage reaches the target charge voltage. In the third mode, adjustment of the discharge starting voltage is also performed at the same time.

Figure 20:
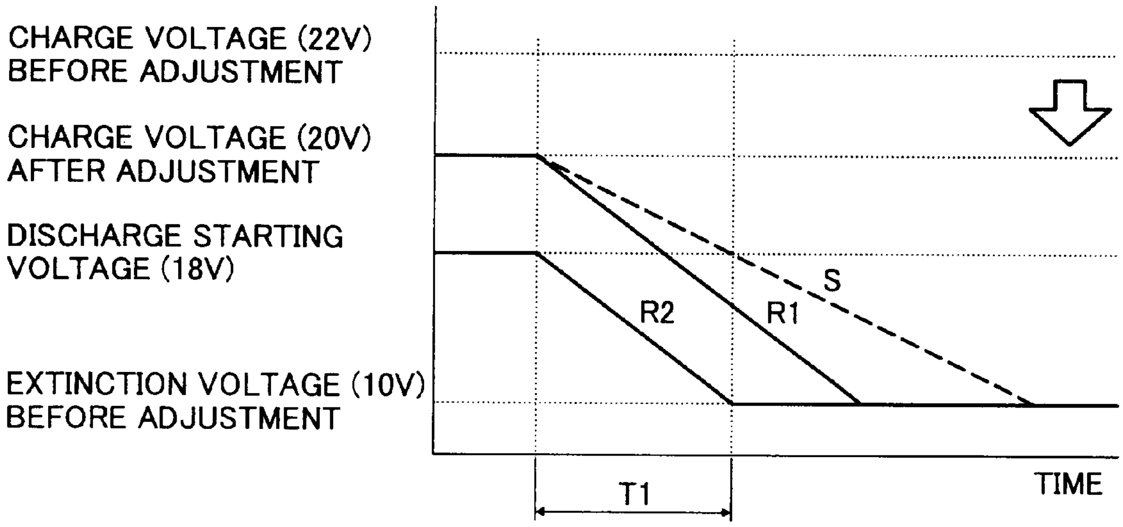
FIG. 20 is a graph of still another example of a use voltage range of the capacitor when the system structure is minimum, where the broken line S represents the discharge characteristic of the capacitor in an initial state, the solid line R1 represents a discharge characteristic of the capacitor before adjustment of a charge starting voltage, and the solid line R2 represents a discharge characteristic of the capacitor in a deterioration state and after the adjustment of the charge starting voltage.

FIG. 20 is a graph of a use voltage range and discharge time of the capacitor 202 when the system structure is minimum (minimum scale, no connection to peripheral apparatuses). In FIG. 20, the broken line S represents the discharge characteristic of the capacitor 202 in an initial state, the solid line R1 represents a discharge characteristic of the capacitor 202 before adjustment of the discharge starting voltage, and the solid line R2 represents a discharge characteristic of the capacitor 202 in a deterioration state and after the adjustment of the discharge starting voltage. The discharge starting voltage is also adjusted to 18 volts.

As shown by R1 in FIG. 17 and R2 in FIG. 20, a discharge time until the voltage reaches the extinction voltage (10 volts) is represented by T1. The discharge electric energy at this time is sufficient as power supply energy. Further, the difference between the target charge voltage and the discharge starting voltage is set similarly to the first and the second modes. Because the target charge voltage is adjusted by detecting a system structure in this way, it is possible to lower the voltage used until charge completion and to improve the usability for users.

Use range control in a fourth mode is explained with reference to FIGS. 21 and 22. According to the use range control function in the fourth mode, a use voltage range of the capacitor 202 is adjusted based on a system structure of the digital copying machine 1 and performance of the capacitor 202. Specifically, when the charge/discharge control unit 203 detects performance deterioration of the capacitor 202, the engine control unit 205 detects the system structure, calculates a total power consumption of the peripheral apparatuses connected (or recognizes the system of the peripheral apparatuses), and adjusts a setting value of a lower-limit voltage for recharging previously set at 20.5 volts to 18.5 volts depending on the state of the peripheral apparatuses. The "lower-limit voltage for recharging" means a charge voltage for recharging because the charged voltage gradually decreases owing to self-discharge of the capacitor 202 after charge completion and is a value that is set for control. In other words, when the charged voltage thereof gradually decreases during self-discharge and when the charged voltage reaches the lower-limit voltage for recharging, a command of starting charge is given by the engine control unit 205 and charging is performed until the charged voltage reaches the target charge voltage. In the fourth mode, adjustment of the discharge starting voltage is also performed at the same time.

Figure 21:
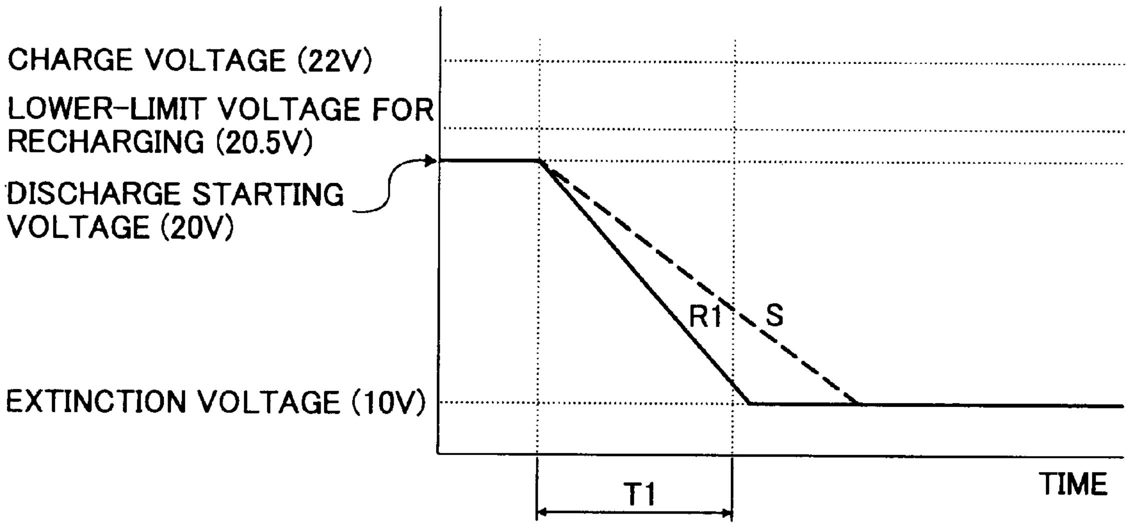
FIG. 21 is a graph of a use voltage range and discharge time of the capacitor when the system structure is in a full system, where the broken line S represents the discharge characteristic of the capacitor in an initial state and the solid line R1 represents a discharge characteristic of the capacitor in a deterioration state.

FIG. 21 is a graph of a use voltage range and discharge time of the capacitor 202 when the system is in a full system (a maximum scale that can be set). In FIG. 21, the horizontal axis represents time and the vertical axis represents discharge voltage of the capacitor 202. The discharge voltage corresponds to charge voltage and is detected by the charged-voltage detecting unit 211. Further, in FIG. 21, the broken line S represents the discharge characteristic of the capacitor 202 in an initial state, and the solid line R1 represents the discharge characteristic of the capacitor 202 in a deterioration state.

Figure 22:
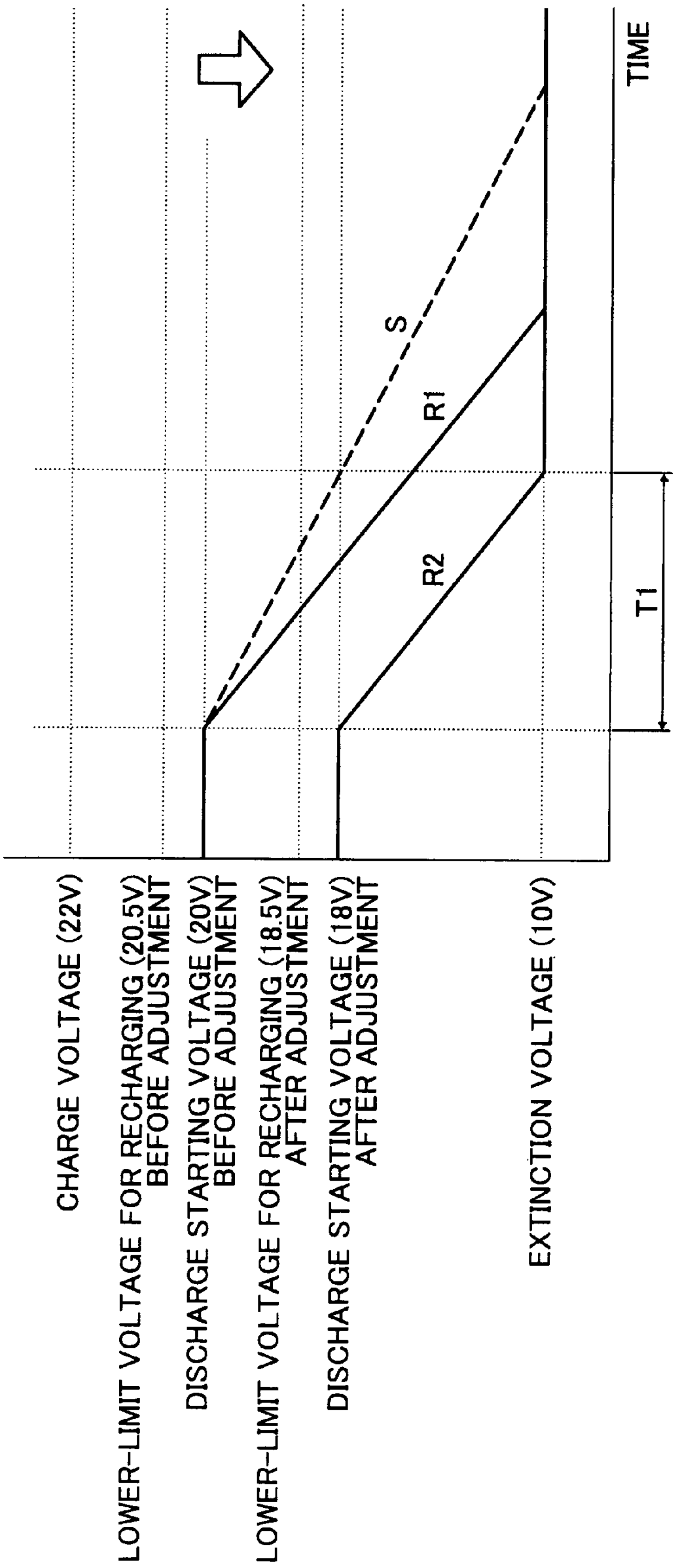
FIG. 22 is a graph of a use voltage range and discharge time of the capacitor when the system structure is minimum, where the broken line S represents the discharge characteristic of the capacitor in an initial state, the solid line R1 represents a discharge characteristic of the capacitor before adjustment of the discharge starting voltage, and the solid line R2 represents a discharge characteristic of the capacitor in a deterioration state and after a setting value of a lower-limit voltage for recharging was adjusted from 20.5 volts to 18.5 volts.

FIG. 22 represents a use voltage range and discharge time of the capacitor 202 when the system structure is minimum (minimum scale, no connection to peripheral apparatuses). In FIG. 22, the broken line S represents the discharge characteristic of the capacitor 202 in an initial state, the solid line R1 represents the discharge characteristic of the capacitor 202 before adjusting the discharge starting voltage, and the solid line R2 represents a discharge characteristic of the capacitor 202 in a deterioration state and after the adjustment of a setting value of the lower-limit voltage for recharging from 20.5 volts to 18 volts. The discharge starting voltage is also adjusted from 20 volts to 18 volts.

As shown by R1 in FIG. 21 and R2 in FIG. 22, the discharge time until the voltage reaches the extinction voltage (10 volts) is T1. The discharge electric energy at this time is sufficient as power supply energy. Further, the difference between the lower-limit voltage for recharging and the discharge starting voltage is also set similarly to the first to the third modes. The lower-limit voltage for recharging is adjusted by detecting system structure in this way. Therefore, it is possible to lower the voltage until recharge and to improve the usability for users.

According to an aspect of the present invention, depending on performance of the capacitor and a system scale (required auxiliary electric energy) of an image forming apparatus (digital copying machine), when a system scale is small, the performance of the capacitor is not determined to be insufficient even if the performance thereof deteriorates. When a system scale is large, the performance of the capacitor is determined to be insufficient, and a warning of function insufficiency can be given. When a system scale is small, a startup delay does not occur or hardly occur even if auxiliary electric energy is limited to be low owing to performance deterioration of the capacitor, and therefore, reduction in user's usability is small. When a system scale is large and startup delays owing to performance deterioration of the capacitor, the user's usability becomes worse, and a warning of function insufficiency can be given.

According to another aspect of the present invention, it is possible to use the auxiliary power device for a long time by adjusting a use voltage range of the capacitor depending on performance deterioration of the capacitor when the system scale is small. When a system scale is small, a delay in startup does not occur or hardly occur, and at least reduction in usability of user is low even if the auxiliary electric energy may be limited to a small range.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:

a first power-supply unit that outputs a first DC power;

a second power-supply unit that outputs a second DC power, the second power-supply unit including a chargeable capacitor;

a measuring unit that measures a performance of the capacitor;

a configuration detecting unit that detects system configuration of the image forming apparatus, the detected system configuration including an indication representing connection or disconnection with at least one peripheral apparatus; and a determining unit that determines performance insufficiency of the capacitor based on both of (a) the performance measured by the measuring unit and (b) the system configuration detected by the configuration detecting unit, wherein the determining unit determines a total power consumption based on power consumption data for each of the at least one peripheral apparatus indicated to be connected in the system configuration detected by the configuration detecting unit, and the determining unit determines that performance of the capacitor is insufficient, when the total power consumption is not equal to or below a threshold level.

2. The image forming apparatus according to claim 1, wherein the performance is changes in a capacitance of the capacitor with time.

3. The image forming apparatus according to claim 1, wherein the performance is changes in a time required for charging the capacitor to a predetermined voltage.

4. The image forming apparatus according to claim 1, wherein the performance is a difference between a first voltage at the time of no load on the capacitor and a second voltage at a predetermined time elapsed after starting charging of the capacitor.

5. The image forming apparatus according to claim 1, wherein the performance is a difference between a first voltage at the time of no load on the capacitor and a second voltage at a predetermined time elapsed after supplying power to the capacitor.

6. The image forming apparatus according to claim 1, wherein the performance is charged voltage of the capacitor.

7. The image forming apparatus according to claim 1, further comprising a control unit that adjusts a use range of the capacitor when the determining unit determines performance insufficiency of the capacitor.

8. The image forming apparatus according to claim 7, wherein the control unit adjusts a discharge starting voltage of the capacitor.

9. The image forming apparatus according to claim 7, wherein the control unit adjusts an extinction voltage of the capacitor.

10. The image forming apparatus according to claim 7, wherein the control unit adjusts a target charge voltage of the capacitor.

11. The image forming apparatus according to claim 7, wherein the control unit adjusts a lower-limit voltage for recharging of the capacitor.

12. The image forming apparatus according to claim 1, wherein the configuration detecting unit further detects an apparatus type of the peripheral apparatus as the system configuration.

13. The image forming apparatus according to claim 1, wherein the configuration detecting unit detects the system configuration by communicating with each of components of the image forming apparatus.

14. The image forming apparatus according to claim 1, further comprising an input receiving unit that receives input of information about the system configuration.

* * * * *